F. HAMILTON & H. H. STYLL.
LENS CLIP.
APPLICATION FILED JUNE 4, 1915.
1,250,703. Patented Dec. 18, 1917.
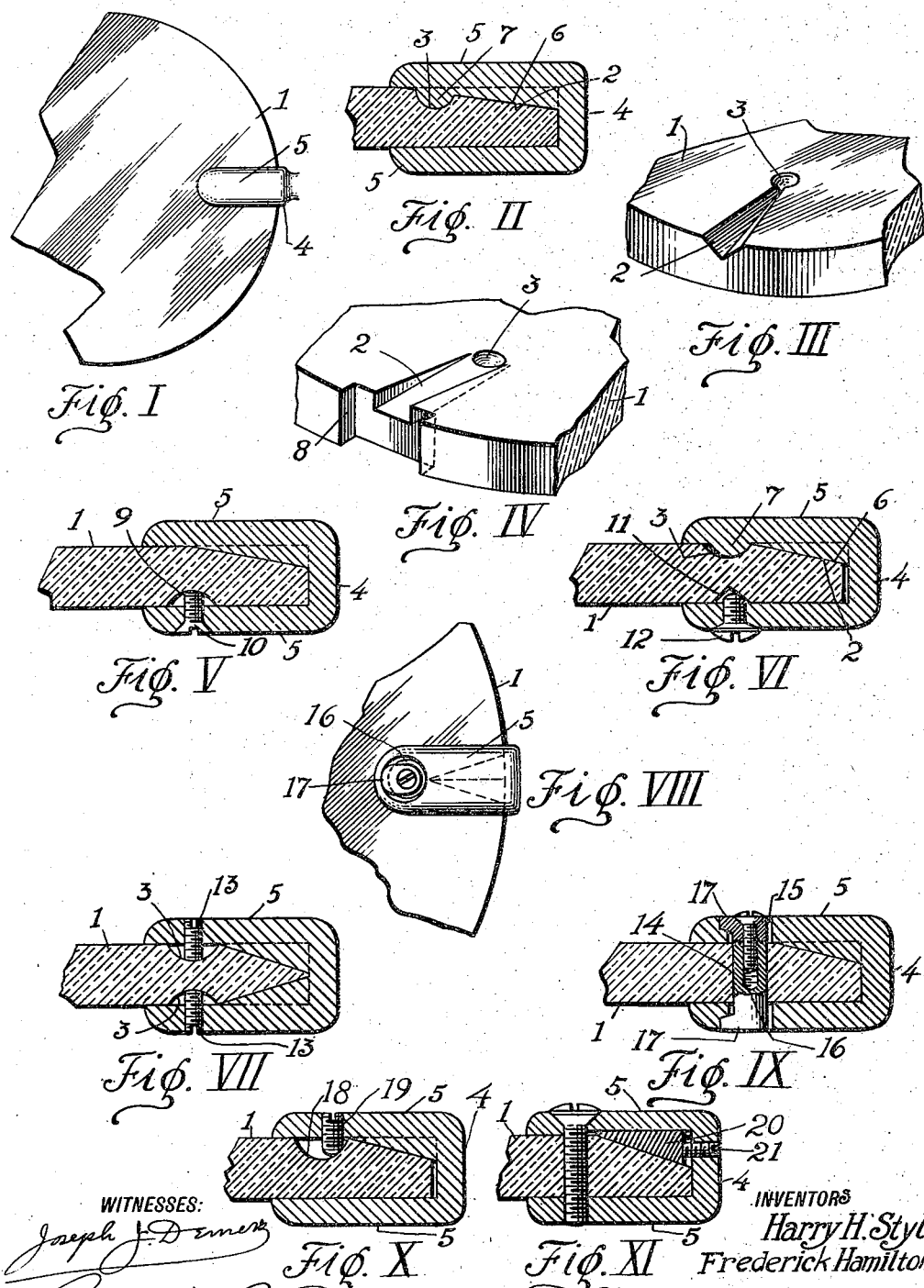
WITNESSES:
INVENTORS
Harry H. Styll
Frederick Hamilton
BY
H. H. Styll & H. K. Parsons
ATTORNEY

UNITED STATES PATENT OFFICE.

FREDERICK HAMILTON, OF PROVIDENCE, RHODE ISLAND, AND HARRY H. STYLL, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS-CLIP.

1,250,703.      Specification of Letters Patent.     Patented Dec. 18, 1917.

Application filed June 4, 1915. Serial No. 32,149.

*To all whom it may concern:*

Be it known that we, FREDERICK HAMILTON and HARRY H. STYLL, citizens of the United States, residing at Providence and Southbridge, respectively, in the county of Providence and Worcester and State of Rhode Island and Massachusetts, have invented certain new and useful Improvements in Lens-Clips, of which the following is a specification.

This invention relates to ophthalmic mountings, and more particularly to improvements in lens clips and the manner of connecting the same to the lenses of eyeglasses, spectacles and the like.

The primary object of the invention is to provide a mounting between the lenses and lens clips of eyeglasses or the like which will efficiently and effectively prevent relative movement of either of the parts with respect to the other.

Other objects are to provide a clip which may be readily tightened upon the lens should the same become loose thereon for any reason, to provide a clip which is applicable to lenses of various thicknesses, to provide positive adjustable means for locking the clip upon the lens, and to so construct the mounting as to provide a cheap, efficient and practical mounting and one which is readily and easily applied to a lens.

With these and other objects in view, the invention consists in the novel features of construction, combination and arrangement of parts, as will be hereinafter more fully described, illustrated in the accompanying drawings and claimed.

In the drawings:

Figure I is a fragmentary front elevation of the improved lens and clip.

Fig. II is a longitudinal sectional view of the structure illustrated in Fig. I.

Fig. III is a fragmentary perspective view of the lens showing the character of the slot therein.

Fig. IV is a view similar to Fig. III illustrating a slightly modified form of slot.

Fig. V is a longitudinal section through a slightly modified form of clip.

Fig. VI is a similar view of another slight modification.

Fig. VII is a similar view of a further slightly modified form.

Fig. VIII is a plan view of still another modification.

Fig. IX is a longitudinal sectional view through the structure illustrated in Fig. VIII.

Fig. X is a longitudinal sectional view through a further modification.

Fig. XI is a similar view of a still further modification.

Referring to the drawings by numeral, and more particularly to Figs. I to III inclusive of the drawings, 1 designates a lens which has formed therein in any suitable manner the substantially V-shaped slot 2. This slot is formed in one flat face of the lens at the edge thereof and extends inwardly upon the face of the lens any desired distance.

By reference to Fig. III of the drawings it will be noted that the slot tapers both longitudinally and horizontally so that in effect it resembles in shape half of a pyramid which has been cut upon the hypotenuse of its base to the apex thereof, the larger or base end of the slot opening into the edge of the lens and as illustrated, extending approximately half way therethrough.

At its apex or point of convergence into the face of the lens the slot has formed thereadjacent the recess 3 which may be of semi-spherical or conical shape and which extends into the lens any suitable and desired distance.

The improved lens clip 4 for engagement with the lens just described comprises the usual arms 5 for engagement with either side of the lens. One of these arms upon its inner face is provided with a boss or projection 6 of a size and shape corresponding with the slot 2 so that when the clip is applied to the lens and the opposite arm is bent into engagement with the opposite face of the lens the engagement between the boss 6 and the slot 2 will be such as to absolutely prevent any rocking movement or play of the lens within the clip; the arm 5 carrying the projection 6 is also provided with a lug 7 for engagement with the recess 3 so as to positively prevent accidental removal of the lens from the clip, a cementitious material preferably being employed in connecting the lens with the clip, although it will be understood that other means may be employed if desired.

In Fig. IV of the drawings we have illustrated a slightly modified form of slot which as shown is of the same width throughout its length, but which tapers longitudinally in a manner similar to the slot 2 of the lens 1, as shown in Fig. III of the drawings. The edge of the lens in this form has also been shown as being provided with the cut-out portion 8 into which the transverse width of the clip is adapted to be seated in order to further increase the efficiency of the mounting and positively guard against any rocking movement of the lens within the clip. It will be understood that if we desire we may use this cut-out portion 8 in connection with the slot illustrated in Fig. III of the drawings, should we so desire. It will be further understood that the clip for use in connection with the formation of the lens illustrated in Fig. IV of the drawings will be provided with a boss corresponding in shape to the shape of the slot and will in other respects be of substantially the same construction as the clip 4 shown in Figs. I and II of the drawings.

In Fig. V of the drawings we have illustrated a slightly modified form of our invention in which the face of the lens opposite to the face having the slot 2 is provided with a recess 9 into which is seated the inner end of a screw 10 which is threaded into the arm of the clip thereby locking the lens against accidental removal from the clip.

Fig. VI of the drawings illustrates another slightly modified form of our invention in which the lens and clip in addition to being provided with the slot and boss 2 and 6 respectively and the recess 3 and lug 7 respectively are provided with additional means for preventing movement one with respect to the other.

In this form of the invention the lens at a point approximately diametrically opposite from the recess 3 is provided with a second recess 11 to receive a screw 12 which is threaded into the adjacent arm of the clip. This construction embodies substantially the constructions illustrated in Figs. II and V of the drawings.

In Fig. VII of the drawings a still further modified form of the invention is shown as including a double embodiment of the structure illustrated in Fig. II of the drawings, with the exception that instead of being provided with the integral lugs 7 the arms of the clip have threaded thereinto screws 13 which have their inner ends in engagement with the recesses 3.

Figs. VIII and IX of the drawings illustrate another embodiment of the invention in which the lens and lens clip in addition to being provided with the slot and boss connection are also provided with further novel means operable in combination with the boss and groove for more effectively insuring their rigid engagement. The lens in this form of the invention has an aperture 14 extending therethrough in alinement with relatively larger openings 15 in the arms of the clip. A stud 16 is rotatably mounted in the aperture 14 and carries at either of its ends the cams 17 for operation in the openings 15, whereby rotation of the stud will cause the cams to engage with the walls of the openings and cause the lens to be firmly wedged within the clip.

In Fig. X of the drawings another efficient modification of the invention has been shown as including the inclined slot and boss connection between the lens and clip and a screw and recess connection for locking the lens in wedged position within the clip. A recess 18 is formed in the face of the lens having the inclined slot, and threaded into an aperture in one arm of the clip and engaged with the slot is a screw 19 which has the inner end thereof engaged with the angular face of the recess whereby tightening of the screw will cause a wedging between the lens and clip.

Another modification is illustrated in Fig. XI, and is shown as comprising the lens having the inclined slot, and the wedge 20 for sliding engagement with the slot for clamping the lens within the clip. In this construction a screw 21 is threaded into the inner edge of the clip and has the inner end thereof engaged against the wedge so that tightening of the screw will slide the wedge and cause a clamping action between the lens and clip.

By reference to the drawings it will be noted that the recess 11 is relatively larger than the inner end of the screw 12 so that when the screw is threaded into engagement therewith the inner end thereof will engage with the inclined wall of the recess and will cause the boss of the clip to ride in the tapered slot of the lens and thereby insure a rigid connection therebetween.

We claim:

1. The combination with a lens having an outwardly deepening groove formed in one face thereof and having an adjacent inclined portion, of a clip embracing the lens and having a wedgelike portion interlocking with the groove in the lens and a locking member bearing against the inclined face to force the lens inwardly of the clip and force tight interlocking engagement between the inclined face of the groove and the wedge of the clip, substantially as illustrated.

2. The combination with a lens having an outwardly deepening groove formed therein and having a recess with an inclined wall formed therein, of a clip embracing the lens and having a wedged shaped portion interlocking with the inclined groove and having a threaded fastening device bearing against the inclined wall of the recess, whereby increase of pressure of the fastening device against the wall will relatively shift the lens and clip to cause tighter engagement between the inclined faces of the wedge and groove securely locking them together, substantially as described.

3. The combination with a lens having a slot formed therein extending inwardly from the edge of the lens and of gradually decreasing depth, of a clip embracing the lens and having a wedge shaped rib on the inner face thereof for engagement in the slot, whereby as the clip is pressed on to the lens the inter-engagement of the rib and slot will insure a tight engagement between the embracing clip and the lens, and means for locking the clip in its innermost pressed position relative to the lens.

4. An ophthalmic mounting including in combination with a lens having an inclined slot, a clip having a portion to fit the slot, and means for relatively shifting the lens and clip to cause a wedging action therebetween.

5. An ophthalmic mounting including a lens having an inclined slot formed therein, a clip for supporting said lens, a wedge connection between said slot and said clip, and a screw for relatively shifting the parts of the mounting to cause a clamping action between the lens and clip.

In testimony whereof we affix our signatures.

FREDERICK HAMILTON.
HARRY H. STYLL.